United States Patent
Tsuchiya (10) Patent No.: US 7,196,802 B2
(45) Date of Patent: Mar. 27, 2007

(54) IMAGE PROCESSING DEVICE HAVING COMPRESSION JUDGEMENT

(75) Inventor: Noriaki Tsuchiya, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1084 days.

(21) Appl. No.: 09/794,253

(22) Filed: Feb. 28, 2001

(65) Prior Publication Data

US 2001/0022664 A1    Sep. 20, 2001

(30) Foreign Application Priority Data

Mar. 1, 2000  (JP) .............................. 2000-056323

(51) Int. Cl.
*G06F 3/12* (2006.01)
*G06F 15/00* (2006.01)
*G06K 15/00* (2006.01)

(52) U.S. Cl. ..................... 358/1.1; 358/1.9; 358/1.18

(58) Field of Classification Search ........ 358/1.1–1.18, 358/539, 426.04, 437, 462
See application file for complete search history.

(56) References Cited

U.S. PATENT DOCUMENTS

| | | | |
|---|---|---|---|
| 5,650,861 A | 7/1997 | Nakajima et al. | 358/433 |
| 5,946,459 A * | 8/1999 | Plakosh | 358/1.16 |
| 5,991,515 A * | 11/1999 | Fall et al. | 358/1.15 |

FOREIGN PATENT DOCUMENTS

| | | |
|---|---|---|
| JP | 4-10868 | 1/1992 |
| JP | 04-010868 | 1/1992 |
| JP | 6-311045 | 11/1994 |
| JP | 07-074961 | 3/1995 |
| JP | 7-74961 | 3/1995 |
| JP | 8-224917 | 9/1996 |
| JP | 10-086451 | 4/1998 |
| JP | 10-181115 | 7/1998 |
| JP | 11-177831 | 7/1999 |

\* cited by examiner

*Primary Examiner*—Douglas Q. Tran
(74) *Attorney, Agent, or Firm*—Morgan, Lewis & Bockius, LLP (57) ABSTRACT

A CPU executes decomposing processing based on data by a PDL received through a communication interface, and generates data by an intermediate language for each band. Here, the CPU judges whether or not the values of the image data are all zero as the image data in the band. As to the image data whose values become all zero, rendering processing from the intermediate language to the image data and compression processing of the image data by a JBIG compressor are omitted, and only a termination code is stored as coded data in a main memory. Thereby, the processing speed can be increased. A JBIG decompressor decompresses the coded data to generate output image data, which is outputted to a printing unit. Thus, the image processing device of the invention increases the speed of generating coded data, and enhances the total throughput.

18 Claims, 5 Drawing Sheets

CODE BAND 1   CODE BAND 2   CODE BAND 3

| ADDRESS | DATA |
|---|---|
| 0 0 0 0 (h) | 0 1 2 3 4 5 6 0 |
| 0 0 0 1 (h) | F F 0 2 X X X X |
| . . . | |
| 0 1 0 0 (h) | 5 6 4 0 F F 0 2 |
| . . . | |
| 0 2 0 0 (h) | F F 0 2 X X X X |

IMAGE PROCESSING DEVICE HAVING COMPRESSION JUDGEMENT

BACKGROUND OF THE INVENTION

1. Field of the Invention

The present invention relates to an image processing device suitable for use in printers, specifically to an image processing device that compresses image data and decompresses again.

2. Description of the Related Art

A printer such as a laser printer receives a page description language (PDL) from a host computer by way of a network such as the Ethernet, and a printer controller inside the printer converts the PDL into an intermediate language that is easier to convert it into image data (decomposing processing), and then generates a print image from the intermediate language (rendering processing). At this case, a memory capacity more than 32 M bytes is usually needed in order to store print image data for one page of the A3 size in a color bitmap image, with the resolution 600 dpi.

Naturally, it has been considered to compress image data before storing and decompress before printing to output. In such a case, for example, one page is divided into plural regions (bands) by a specific number of lines (banding processing), and the image data is compressed by each band, which is a technique usually adopted.

The general banding processing with compression will be explained. First, in the decomposing processing, an inputted PDL is decoded, an intermediate language by each band is generated, and the intermediate language by each band for the whole one page is stored in the memory. Next, rendering is carried out by each band, and the print image data is stored in the memory. As the image data for one band is made, the data is compressed to be stored in the memory. This is carried out for all the bands in one page. After the compression for one page is completed, a decompressor decompresses the data in real time, and outputs the image data to a print engine to form the image. Thus, the image can be formed without decompressing the image data for one page in the memory.

However, in this method of compressing the image data for one page and thereafter decompressing it, the compression and the decompression each require certain time, which is a problem. When a manuscript of the A3 size with the resolution of 600 dpi is compressed and decompressed in real time at the rate of about 20 M bits/sec, it takes about three seconds if the manuscript is a black-and-white image, and it takes about 12 seconds if that is a color image. In case of receiving the PDL and forming the image, the time for decomposing and rendering is also needed in addition to the above time; and accordingly, a large amount of time will be spent before starting the printing, which is a problem.

Also, a method has been proposed which improves the rendering performance and outputs images in real time to a print engine by an intermediate language without the compression and the decompression processing. However, the time required for the rendering processing varies, depending on the image data. In the printer disclosed in Japanese Published Unexamined Patent Application No. Hei 8-224917, for example, a system has been proposed which, after decompressing image data, compresses the image data and decompresses it when printing, if the time required for the rendering by each band is predicted and the predicted time does not reach a time required for the print engine processing the data at its processing speed. However in such a system, an intermediate language and coded data are mixed, and the image data is required to be generated while switching the intermediate language and the coded data when the data is outputted to the print engine; and accordingly, the processing becomes complicated, which is a problem.

On the other hand, as a high efficiency compression technique of binary images, JBIG is known as the international standard. In the JBIG, the arithmetic coding method is applied to the entropy coding unit. The arithmetic coding method has been proposed by Elias as an idealistic coding method for an information source not having a memory, and reorganized by Langdon and Rissanen into a practicable form.

Figure 9:
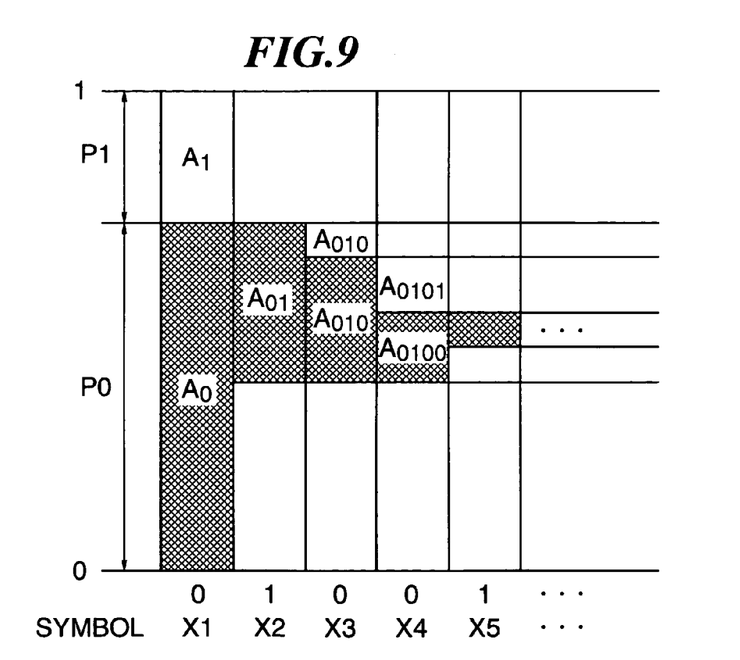
FIG. 9 is a chart explaining the arithmetic coding method.

FIG. 9 is a chart illustrating the arithmetic coding method. First, the area (0, 1) on the number line is divided into P0 and P1 to make the areas A0 and A1 (these areas are called the augend). Next, if the first symbol X1 from the information source is "0", the area A0 is selected; and if it is "1", the area A1 is selected. In the example shown in FIG. 9, X1=0, and the area A0 is selected. The selected areas are hatched on the drawing.

Next, the area A0 is divided by an eventual probability of the second symbol X2 into the areas A00 and A01. Here, if X2="0", the area A00 is selected; and if X2="1", the area A01 is selected. In the example in FIG. 9, X2="1", the area A01 is selected.

Thus, the division of the areas and the selection of the divided areas are carried out for the number of an output series of the information source, and the output series is expressed by the binary-coded decimal notation of one point inside the area obtained by the division at the final stage. Assuming that the nth symbol is given by Xn, the augend when the (n−1)th symbol is coded is A(n−1), and the eventual probability of the inferior symbol (LPS) "1" is P(1), the nth augend A(n) is expressed as follows:

when $Xn=1$, $A(n)=A(n-1)\times P(1)$ when $Xn=0$, $A(n)=A(n-1)-\{A(n-1)\times P(1)\}$ here, LPS=1

And, provided that the code series when the (n−1)th symbol is coded is given by C(n−1), the nth code series C(n) is expressed as follows:

when $Xn=1$, $C(n)=C(n-1)+\{A(n-1)\times P(1)\}$ when $Xn=0$, $C(n)=C(n-1)$ here, LPS=1

In the JBIG, operations involving the multiplication as above are not carried out, and a subtraction-type arithmetic code whereby probability arithmetic operations are carried out only by subtraction is adopted by preparing the values of the augend as a table for each group in correspondence with probability predict values. This coder adopted by the JBIG is called the QM-Coder. This adoption deteriorates the coding efficiency, but makes the hardware configuration simple. The augend and code operations by the QM-Coder are shown bellow.

when $Xn=1$, $A(n)=$ table value $Qn$ $C(n)=C(n-1)+$ table value $Qn$ when $Xn=0$, $A(n)=A(n-1)-$ table value $Qn$ $C(n)=C(n-1)$ here, LPS=1

In the JBIG, the symbol series is generated on the basis of an prediction result obtained by an attention pixel and surrounding pixel values. This prediction value is generated while updating the prediction result at any time by a learning prediction table that feeds back the prediction result. The JBIG specifies that the prediction table value is all zero at the initial state. That is, if the attention pixel value is all zero, the prediction value of this prediction table remains zero, and the prediction all hits. Therefore, the foregoing symbol series Xn becomes all zero. Since $C(n)=C(n-1)$ and $C(0)=0$, the final code series becomes zero. In this case, the generated code is only the termination marker ('FF02'). Thus, the JBIG achieves highly efficient compression by means of a learning predictor and an arithmetic coding method.

When highly efficient compression such as the JBIG is used as the compression, a high compression rate can be acquired, but in contrast it is difficult to increase the processing speed. For example, in Japanese Published Unexamined Patent Application No. Hei 6-311045, a technique is disclosed which increases the operation speed of the arithmetic calculation unit. However, since the technique needs to use the learning predictor that feeds back the prediction result and execute the calculation of the augend by each symbol, it is impossible to execute the parallel processing of plural pixels, leading to impossibility of increasing the processing speed, which is a problem to be solved.

SUMMARY OF THE INVENTION

The present invention has been made in view of the aforementioned circumstances, and provides an image processing device that executes compression and decompression by means of a high efficient coding method such as the JBIG and generates coded data at high speed to enhance the total throughput.

The image processing device according to the invention codes image data by a compression part, thereafter decodes the compressed coded data by a decompression part and generates output image data, in which the values of the image data are judged, the compression processing in the compression part is omitted in accordance with the judgment result, and a predetermined value is inputted to the decompression part as the coded data. For example, whether or not the values of the image data are all zero is judged, and if they are judged as all zero, preferably a termination code corresponding to the coding method in the compression part is inputted to the decompression part. When the predetermined value is inputted with a continuous termination code or the like, preferably the decompression part generates the output image data having a specific size whose value is zero.

Thereby, the image processing device can increase the processing speed with the omission of the compression processing. In addition, the coded data becomes the same data as that coded by the compression part, and accordingly a decoding part can be used as it is. For example, when the inputted image data is data indicating images in a unit of band, obtained by dividing the images for one page into plural areas, the probability that the image data in one band is all zero becomes high, which effects to increase the processing speed remarkably. Further, when the predetermined value is inputted, the decompression part can reduce a time for decoding by generating output image data having a specific size whose value is zero.

The image data can directly be generated from a page description language, for example, or they can be generated after generating an intermediate language temporarily. However, the processing speed can be increased still more by judging the values of the image data when generating the image data or when generating the intermediate language. For example, a judgment of the value of the image data when generating the intermediate language will omit not only the compression processing but also the rendering processing that generates the image data from the intermediate language.

BRIEF DESCRIPTION OF THE DRAWINGS

Preferred embodiments of the present invention will be described in detail based on the following, wherein.

DETAILED DESCRIPTION OF THE PREFERRED EMBODIMENTS

Figure 1:
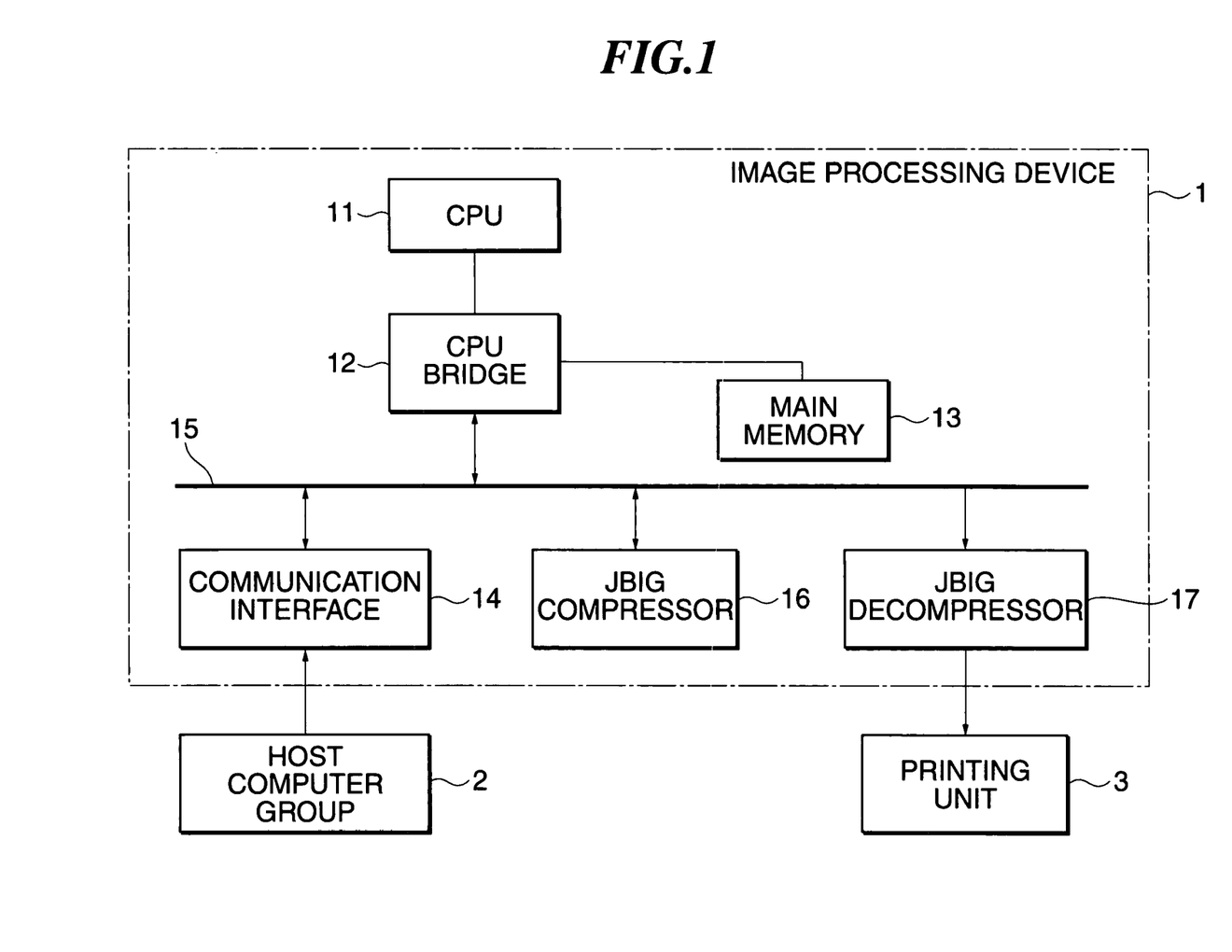
FIG. 1 is a block diagram illustrating one embodiment of an image processing device according to the invention.

FIG. 1 is a block diagram illustrating one embodiment of an image processing device according to the invention. In the drawing, 1 denotes an image processing device, 2 a host computer group, 3 a printing unit, 11 a CPU, 12 a CPU bridge, 13 a main memory, 14 a communication interface, 15 a bus, 16 a JBIG compressor, and 17 a decompressor. The image processing device 1 in this embodiment receives data described by the PDL or the like from the host computer group 2, executes drawing processing in accordance with the PDL, and outputs image data to the printing unit 3. Naturally, the data received by the image processing device 1 is not limited to the data described by the PDL, but it may be image data sent directly from the host computer group 2.

The CPU 11 controls the whole image processing device 1 and functions as a processing part. The CPU 11 executes drawing processing in accordance with data by the PDL or the like transmitted from the host computer group 2, compresses the image data by means of the JBIG compressor 16, and stores the compressed coded data in the main memory 13. And, when outputting the image data to the printing unit 3, the CPU 11 makes the JBIG decompressor 17 decompress the coded data. The drawing processing may generate the image data directly from the PDL, or after converting the data once into an intermediate language by the decomposing processing, it may generate the image data by the rendering processing. Further, the image data can be generated in a unit of one page, or in a unit of band being one area in one page that is divided into plural areas. Further, when generating the image data directly from the PDL, or when converting the data once into the intermediate language by the decomposing processing, the CPU 11 judges the values of the image data. For example, it judges whether all the values of the image data are zero. And in accordance with the judgment result, if all the values of the image data are judged as zero, for example, the compression by the JBIG compressor 16 is not executed, and a predetermined value, for example, only the termination code ("FF02") is handled as the coded data in the JBIG. The CPU 11 is connected to the bus 15 by way of the CPU bridge 12.

The main memory 13 stores programs that the CPU 11 executes, and various data. Specially, it stores the data by the PDL that is transmitted from the host computer group 2, the intermediate language, generated image data, and coded data, etc.

The communication interface 14 communicates with the host computer group 2, and receives data by the PDL.

The bus 15 mutually connects the communication interface 14, the JBIG compressor 16, and the JBIG decompressor 17, and also the CPU 11 and the main memory 13 by way of the CPU bridge 12. Naturally, the other various units may be connected to the bus 15.

The JBIG compressor 16 compresses image data transmitted by way of the bus 15 in accordance with the JBIG, and generates coded data. The JBIG decompressor 17 decompresses coded data sent by way of the bus 15 in accordance with the JBIG, and outputs the result to the printing unit 3. The JBIG decompressor 17 may be configured so as to output the image data whose values are all zero forcibly, when the termination code is sent continuously.

Figure 2:
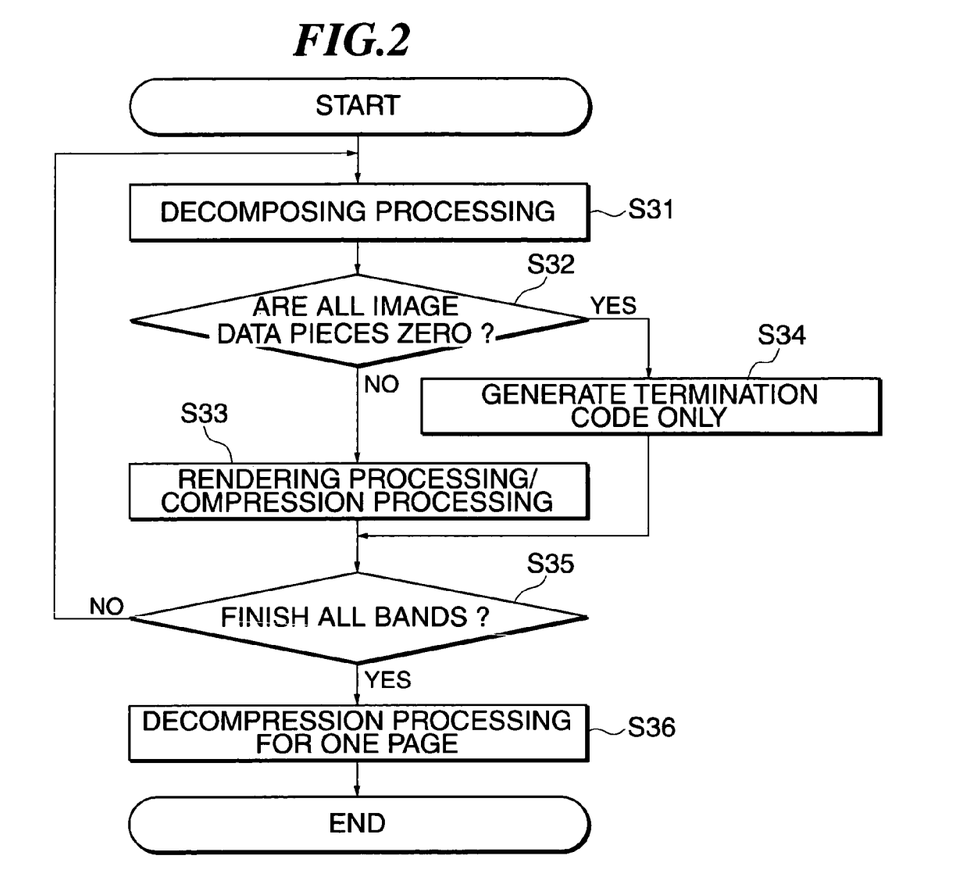
FIG. 2 is a flowchart illustrating an example of operation in the embodiment of the image processing device according to the invention.

FIG. 2 is a flowchart illustrating an example of operation in the embodiment of the image processing device according to the invention. This chart shows the flow of operations, in which the CPU 11 converts the data by the PDL transmitted from the host computer group 2 into an intermediate language by the decomposing processing, and then generates the image data by the rendering processing. Here, the image data is generated in a unit of band.

When data by the PDL is transmitted from the host computer group 2, the communication interface 14 receives the data, and transfers the received data by the PDL to the main memory 13 by way of the bus 15 and the CPU bridge 12, where the data are stored.

The CPU 11, referring to the data by the PDL stored in the main memory 13, executes the decomposing at S31, and converts the data by the PDL into the intermediate language by each band. In general, the data by the PDL is made in a unit of page, which is converted into the data by each band. Thereby, the image data is made easy to be generated in a unit of band.

At the moment when the intermediate language is generated in a unit of band by the decomposing processing, the value of the image data in the band is judged at S32. For example, referring to the intermediate language by each band and judging whether or not the band includes objects to be drawn will determine whether or not all the values of the image data are zero when the image data is generated. If it is judged that the band includes the objects to be drawn and there are pixels that the values of the image data are not zero, the image data for one band is generated by the rendering processing based on the intermediate language, at S33. The image data thus generated is sent to the JBIG compressor 16 by way of the CPU bridge 12 and the bus 15, and the JBIG compressor 16 compresses the image data in accordance with the JBIG to generate coded data. The coded data is stored in the main memory 13 again by way of the bus 15 and the CPU bridge 12.

If all the values of the image data generated are judged as zero, the rendering will not be carried out, the compression of the image data will not be executed by the JBIG compressor 16, and at S34, a predetermined value as the coded data will be stored in the main memory 13. The predetermined value is needed to be set in advance in accordance with the coding method. In view of the fact that when the image data is all zero, the compression results in the termination code in the JBIG, the termination code ("FF02") is only needed to be stored as the predetermined value in the main memory 13. Thereby, the time required for the rendering processing and the compression processing by the JBIG compressor 16 can be saved, whereby the total processing speed can be increased. Especially in case of the processing by each band, since there occur many cases where the image data in a band is all zero, the effect on increasing the speed becomes significant. Further, since the decompression processing can normally be carried out only with the termination code in the JBIG, the JBIG decompressor 17 can execute the decompression processing without a special configuration.

At S35, whether or not all the foregoing processing are executed to all the bands in one page is judged, and if there remains an unprocessed band, the processing is executed to the band from S31.

As the coded data is obtained from all the bands, the coded data for the bands each is sequentially transferred to the JBIG decompressor 17 from the main memory 13 by way of the CPU bridge 12 and the bus 15 at S36; and the JBIG decompressor 17 executes the decompression, and outputs the image data to the printing unit 3. Further, even if all the coded data for one page is not complete, the JBIG decompressor 17 may be designed to start the decompression processing at a timing such that the output of the image data to the printing unit 3 can be made in time, and output the image data to the printing unit 3. In this case, the compression by the JBIG compressor 16 and the decompression by the JBIG decompressor 17 are designed to be executed in parallel.

Further, in the foregoing example, the coded data compressed by the JBIG compressor 16 is temporarily stored in the main memory 13, and then transferred to the JBIG decompressor 17. However, part or all of the coded data compressed by the JBIG compressor 16 may be transferred directly to the JBIG decompressor 17. In this case, if the values of the image data generated are judged as all zero, the predetermined value is made to be transferred directly to the JBIG decompressor 17 from the CPU 11 by way of the CPU bridge 12 and the bus 15. Further, in the foregoing example, the decomposing processing is executed for each band. However, the decomposing processing may be executed collectively to all the bands, and referring to the result sequentially, the judgment as to whether or not the values of the image data are all zero may be executed. In this case, the processing at S35 returns to S32. Naturally, the foregoing processing is not limited to a unit of band, and in case of white pages being included, the speed can be increased in a unit of page.

Figure 3:
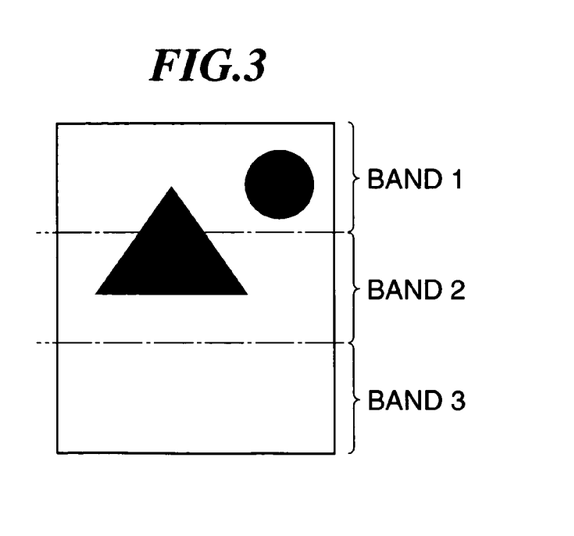
FIG. 3 is a chart explaining one example of image data.
Figure 4:
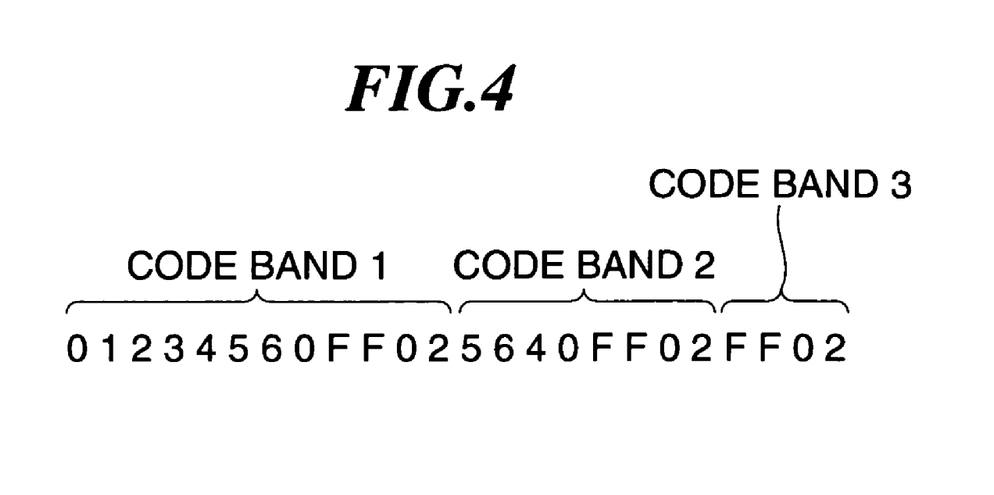
FIG. 4 is a chart explaining one example of coded data.
Figure 5:
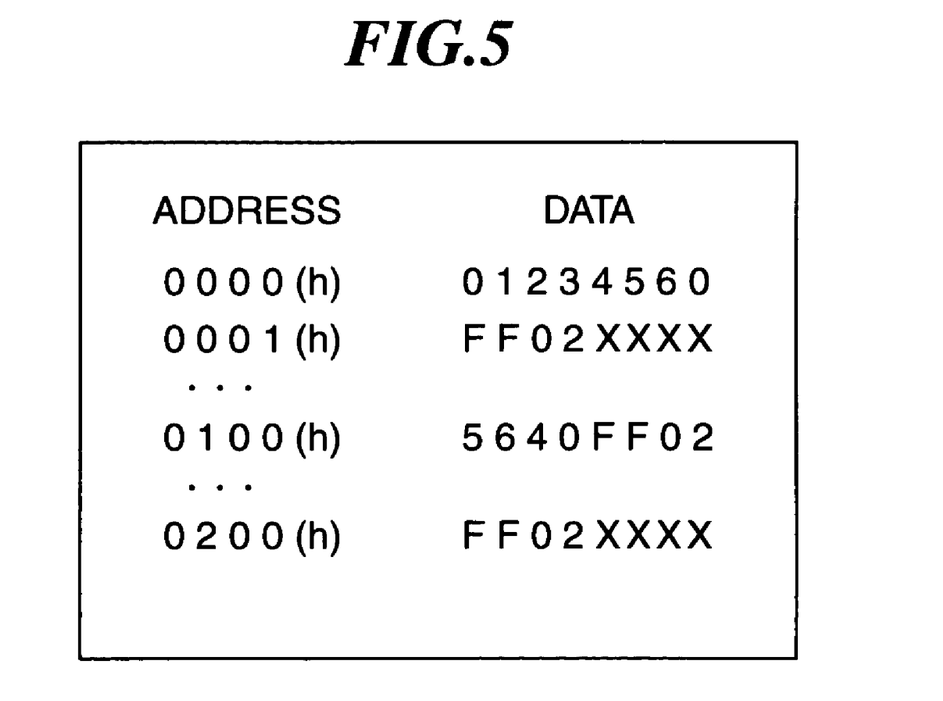
FIG. 5 is a chart explaining one example of a state in which image data is stored in a main memory.

The foregoing operations will be explained with a concrete example. FIG. 3 is a chart explaining one example of the image data, FIG. 4 is a chart explaining one example of the coded data, and FIG. 5 is a chart explaining one example of a state in which the image data is stored in the main memory. Here, as shown in FIG. 3, one page is assumed to be divided into three bands, namely, band 1, band 2, and band 3, in the processing. When the data by the PDL for drawing the image as shown in FIG. 3 is transferred from the host computer group 2, the transferred data by the PDL is converted into the intermediate language by each band by the decomposing processing. At this moment, the image data as shown in FIG. 3 is not generated. However, it is possible to determine whether or not there are any graphics to be drawn in each of the bands, by checking the objects to be drawn in the intermediate language. This determination gives information that the band 1 and the band 2 include graphics, but the band 3 does not include any graphics and the image data generated is all zero.

To follow this determination, in the processing relating to the band 1 and the band 2, the image data as shown by the band 1 and the band 2 in FIG. 3 is generated from the intermediate language by the rendering processing, and transferred to the JBIG compressor 16, where it is compressed. Suppose that as to the band 1, the data is compressed into a code string "01234560", and as to the band 2, the data is compressed into a code string "5640". To each of the code strings are added the termination code "FF02". And, the coded data as shown by the code band 1 and the code band 2 in FIG. 4 are transferred to the main memory 13.

As to the band 3, all the values of the image data are judged as zero, as already mentioned. Therefore, the rendering processing does not generate the image data, and the compression processing does not compress the image data. Instead of this, as shown by the code band 3 in FIG. 4, only the termination code "FF02" is stored as the coded data in the main memory 13.

The main memory 13 stores the data compressed by the JBIG compressor 16, the predetermined values of the termination code, etc., written from the CPU 11 as the coded data. In this case, in the reversible compression such as the JBIG, the compression rate cannot be known before compression, and the data quantity of the coded data compressed by each band cannot be grasped. To cope with this, appropriate memory space is secured in advance for each band in the main memory 13, and the coded data is stored in the memory space corresponding to the band. In an example shown in FIG. 5, the memory area for 0100(h) is secured for one band. Here, (h) represents the hexadecimal.

First, from the memory address 000(h) is stored the first band coded data outputted by the JBIG compressor 16. That is, "01234560FF02" which is shown as the code band 1 in FIG. 4 is stored. In FIG. 5, "X" that is added to the tail thereof is the garbage data other than the coded data. Next, as to the second code, the coded data ("5640FF02") outputted by the JBIG compressor 16 is stored at the memory address 0100(h). As to the third code, since the values of the image data are all zero, the CPU 11 directly writes the termination code "FF02" as the coded data at the memory address 0200(h), not passing the code through the JBIG compressor 16. In this manner, the coded data for each band is stored in the main memory 13 as shown in FIG. 5.

Upon decompression, the coded data thus stored at each address in the main memory 13 is read in succession, the garbage data on the way is read and discarded, and the code string as shown in FIG. 4 is transferred to the JBIG decompressor 17. The garbage data may be controlled not to be read out. Receiving the transfer of the code string, the JBIG decompressor 17 decodes and decompresses the coded data sequentially, generates the image data by each band, and outputs them to the printing unit 3. Thus, the printing unit 3 is able to form the image, when it receives the image data of all the bands including the band whose values of the image data are all zero.

Figure 6:
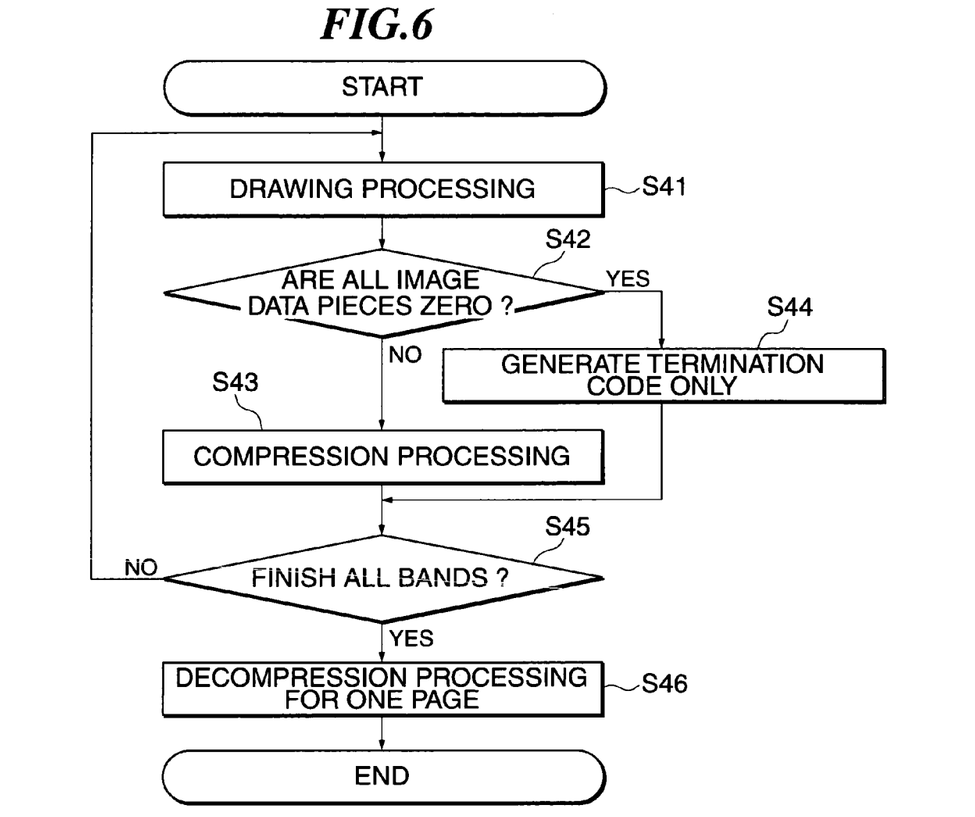
FIG. 6 is a flowchart illustrating another example of operation in the embodiment of the image processing device according to the invention.

FIG. 6 is a flowchart illustrating another example of operation in the embodiment of the image processing device according to the invention. In the operation example shown in FIG. 2, the data by the PDL transmitted from the host computer group 2 is converted into the intermediate language by the decomposing processing, and thereafter the image data is generated by the rendering processing. This example shows an operation in which the image data by each band is generated directly from the data by the PDL.

The communication interface 14 receives the data by the PDL transmitted from the host computer group 2, and transfers the received data by the PDL to the main memory 13 by way of the bus 15 and the CPU bridge 12, where the data is stored.

The CPU 11, referring to the data by the PDL stored in the main memory 13, and generates the image data by each band. During the processing of generating the image data, or by referring to the generated image data, the value of the image data of the band is judged at S42. For example, the value of the generated image data is needed to be judged all zero or not. If it is judged that the generated image data includes the values other than zero, at S43 the generated image data is sent to the JBIG compressor 16 by way of the CPU bridge 12 and the bus 15, and the JBIG compressor 16 compresses the image data in accordance with the JBIG to generate coded data. The coded data is stored in the main memory 13 again by way of the bus 15 and the CPU bridge 12.

If the values of the generated image data are judged as all zero, the compression of the image data will not be executed by the JBIG compressor 16, and at S44, a predetermined value as the coded data will be stored in the main memory 13. The predetermined value is needed to be set in advance in accordance with the coding method. In the JBIG, the termination code ("FF02") is only needed to be stored as the predetermined value in the main memory 13. Thereby, the time required for the compression processing by the JBIG compressor 16 can be saved, whereby the total processing speed can be increased. Further, since the decompression processing can normally be carried out only with the termination code in the JBIG, the JBIG decompressor 17 can execute the decompression processing without a special configuration.

At S45, whether or not the foregoing processing are executed to all the bands in one page is judged, and if there remains an unprocessed band, the processing is executed to the band from S41.

As the coded data is obtained from all the bands, the coded data for the bands each is sequentially transferred to the JBIG decompressor 17 from the main memory 13 by way of the CPU bridge 12 and the bus 15 at S46; and the JBIG decompressor 17 executes the decompression, and outputs the image data to the printing unit 3. Further, even if all the coded data for one page is not complete, the JBIG decompressor 17 may be designed to start the decompression processing at a timing such that the output of the image data to the printing unit 3 can be made in time, and output the image data to the printing unit 3. Further, the coded data compressed by the JBIG compressor 16 may temporarily be stored in the main memory 13, or part of or all of the coded data compressed by the JBIG compressor 16 may be transferred directly to the JBIG decompressor 17. In this case, if the values of the generated image data are judged as all zero, the predetermined value is made to be transferred directly to the JBIG decompressor 17 from the CPU 11 by way of the CPU bridge 12 and the bus 15.

Further, also in case of converting the data into the intermediate language by the decomposing processing and then generating the image data by the rendering processing, the judgment of the values of the image data during the rendering processing may follow the same processing as shown in FIG. 6. Further, in case of the data sent from the host computer group 2 being the image data, the processing may follow the same thereafter, skipping only S41 in FIG. 6.

Further, when the image data are generated and thereafter the values thereof are judged, as mentioned above, the configuration may be such that the JBIG compressor 16 includes a mechanism that judges the image data transferred, and outputs a predetermined value such as a termination code without executing the actual compression processing. In this case, the CPU 11 need not execute the judgment of the values of the image data and the generation of the predetermined value, etc. The CPU 11 is only needed to control to execute the normal compression processing, thereby increasing the operation speed.

Figure 7:
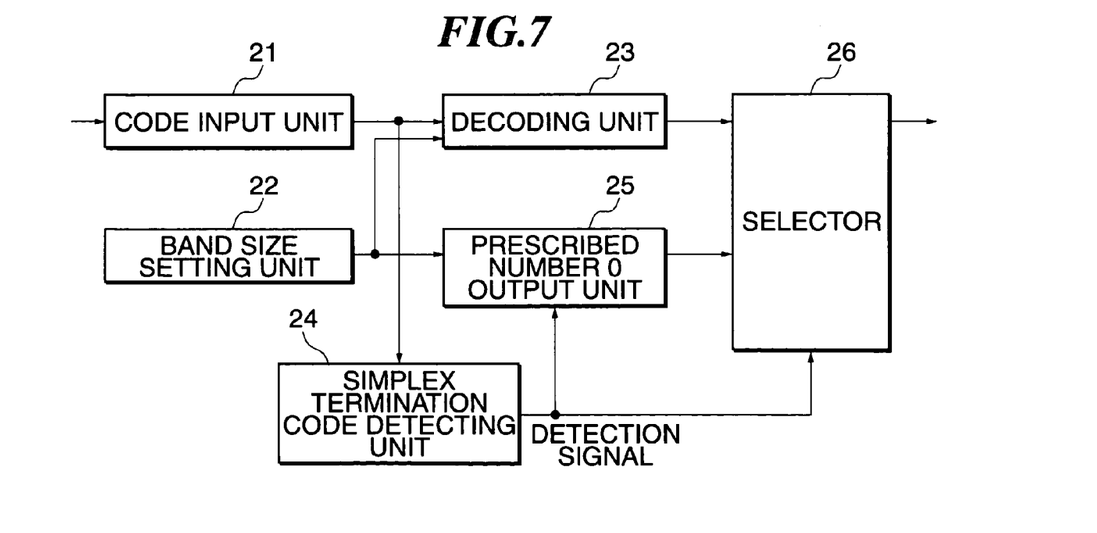
FIG. 7 is a block diagram illustrating one example of the JBIG decompressor.

FIG. 7 is a block diagram illustrating one example of the JBIG decompressor. In the drawing, 21 signifies a code input unit, 22 a band size setting unit, 23 a decoding unit, 24 a simplex termination code detecting unit, 25 a predetermined number 0 output unit, and 26 a selector. The JBIG decompressor 17 may employ the generally used JBIG decompressor as it is, however the configuration shown in FIG. 7, for example, makes it possible to further increase the processing speed.

The code input unit 21 receives the coded data transferred by way of the bus 15. Naturally, the data may contain the predetermined value that is generated without using the JBIG compressor 16. The received coded data is sent to the decoding unit 23 and the simplex termination code detecting unit 24.

When the band size setting unit 22 executes the processing by each band, the size of the band is set in the band size setting unit 22 in advance.

The decoding unit 23 decodes the coded data. Here, it execute the decoding according to the JBIG. When decoding, referring to the band size that is set in the band size setting unit 22, the decoding unit 23 executes the decoding until the image data for the band size is generated.

The simplex termination code detecting unit 24 monitors the inputted coded data, and detects the termination code as the predetermined value that is generated when all the values of the image data in a band are zero. When detecting the termination code only, the simplex termination code detecting unit 24 outputs a detection signal to the prescribed number 0 output unit 25 and the selector 26.

When the simplex termination code detecting unit 24 outputs the detecting signal, the prescribed number 0 output unit 25 outputs the image data of the value zero for the pixel number corresponding to the band size that is set in the band size setting unit 22.

Normally, the selector 26 selects the image data decoded by the decoding unit 23, and outputs the data as the output image data. When the simplex termination code detecting unit 24 outputs the detection signal, the selector 26 selects the image data of the value zero that the prescribed number 0 output unit 25 outputs, and outputs the data as the output image data.

Figure 8:
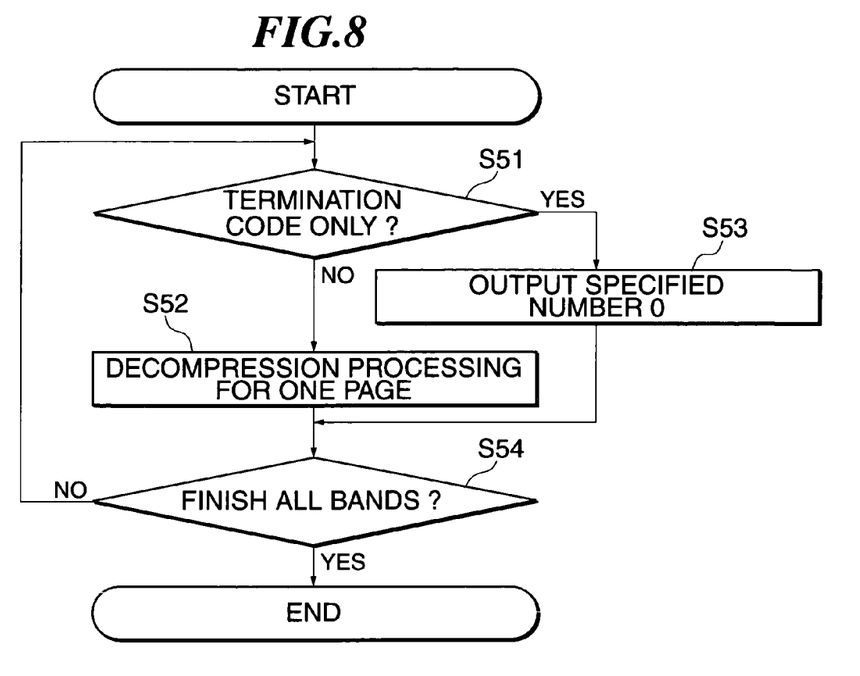
FIG. 8 is a flowchart illustrating one example of operation in the example of the JBIG decompressor.

FIG. 8 is a flowchart illustrating one example of operation in the one example of the JBIG decompressor. In the decompressor 17 shown in FIG. 7, as the coded data read from the main memory 13 is transferred by way of the CPU bridge 12 and the bus 15, the code input unit 21 receives it. When the garbage data is attached to the coded data, as shown in FIG. 5 (indicated by "X"), the garbage data is removed, and as shown in FIG. 4, for example, the processing converting the data into the genuine JBIG code string may be executed. When the data is transferred as the JBIG code string, naturally the code input unit 21 receives it as it is. The coded data received by the code input unit 21 is inputted to the decoding unit 23 and the simplex termination code detecting unit 24.

At S51, the simplex termination code detecting unit 24 judges whether or not the coded data for one band is the termination code only. This judgment can be carried out to check whether the termination code appears continuously or not. When the coded data for one band is not the termination code only, the decoding unit 23 executes the decoding processing of the coded data as it is at S52. The decoding unit 23 outputs the image data of the pixel number corresponding to the band size that is set in the band size setting unit 22. The selector 26 selects the data decoded and outputted from the decoding unit 23, and outputs the data as the output image data.

When the simplex termination code detecting unit 24 detects that the coded data for one band it the termination code only, the values of the image data in the band are all zero. In this case, at S53, the simplex termination code detecting unit 24 transfers the detection signal to the prescribed number 0 output unit 25, and makes the prescribed number 0 output unit 25 output the image data of the value zero for the pixel number corresponding to the band size that is set in the band size setting unit 22. Also, the simplex termination code detecting unit 24 transfers the detection signal to the selector 26, and makes the selector 26 select the output from the prescribed number 0 output unit 25. Thereby, the image data for one band whose values are all zero is outputted as the output image data.

At S54, whether or not the decompression processing is executed to all the bands is judged, and if there remains an unprocessed band, the processing returns to S51 to execute the decompression for the band. As the decompression is executed to all the bands, the image data for one page is sent to the printing unit 3, where the image is formed.

Thus, in case of the values of the image data in one band being all zero, the decoding unit 23 does not execute decoding, and the prescribed number 0 output unit 25 outputs the value zero; and accordingly, the processing speed can be increased with the omission of the decoding processing. Further in this case, if the operation of the decoding unit 23 is halted, it will reduce the power consumption.

The embodiment described above employs the JBIG as the coding method. However, the invention is not limited to this, and the other coding method such as the JPEG can be applied. With regard to the coding method that does not adopts the arithmetic coding method, such as the JPEG, since the code indicating that the values are all zero differs depending on the band size, the predetermined value is needed to be set in accordance with the band size. Upon decompression, the method may be configured to recognize the predetermined value and output the output image data for the band size whose values are all zero.

Further, according to the invention, the same processing can be applied not only to a black-and-white image, but to a color image; that is, it can be applied not only to black-and-white printers, but to color printers that handle YMCK.

As clearly understood from the above description, according to the invention, the compression processing or further the rendering processing can be omitted with respect to part of image data, which effects to increase the total processing speed of the device. Also upon decompression, the decompression processing can be omitted, which further increase the processing speed. Especially in the processing in which the image of one page is divided into several bands, since there occur many bands whose values of the image data in the band are all zero, the invention effects to increase the processing speed still more significantly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device that processes plural pieces of image data corresponding to plural areas of a page, comprising:
   a compression part that compresses the image data to a first coded data when the image data includes object data,
   a processing part that, when the image data does not include the object data, omits compression processing in the compression part and outputs a second coded data indicating the image data does not include the object data, and
   a decompression part that decodes the first and second coded data to output image data corresponding to the page.

2. An image processing device according to claim 1, wherein the second coded data includes a termination code corresponding to a coding system in the compression part.

3. An image processing device according to claim 1, wherein the second coded data consists of a termination code corresponding to a coding system in the compression part.

4. An image processing device according to claim 2, wherein the termination code corresponds to JBIG coding.

5. An image processing device according to claim 3, wherein the termination code corresponds to JBIG coding.

6. An image processing device according to claim 1, further comprising a storage part that stores the first and second coded data, wherein the decompression part decodes the first and second coded data after all the first and second coded data corresponding to the page are stored in the storage part.

7. An image processing device according to claim 1, wherein the processing part generates the image data from a page description language, and judges whether the image data includes the object data during generation of the image data from the page description language.

8. An image processing device according to claim 1, wherein the processing part omits the compression processing when values of the image data are all zero.

9. An image processing device according to claim 1, wherein the compression part compresses the image data to the first coded data when the image data includes a value of other than zero, and the processing part omits the compression processing and outputs the second coded data when the image data are all zero.

10. An image processing method that processes plural pieces of image data corresponding to plural areas of a page, comprising:
    compressing the image data to a first coded data when the image data includes object data,
    omitting compression processing in a compression part when the image data does not include the object data,
    outputting a second coded data indicating the image data does not include the object data when the image data does not include the object data, and
    decoding the first and second coded data to output image data corresponding to the page.

11. An image processing method according to claim 10, wherein the second coded data includes a termination code corresponding to a coding system in the compression part.

12. An image processing method according to claim 10, wherein the second coded data consists of a termination code corresponding to a coding system in the compression part.

13. An image processing method according to claim 11, wherein the termination code corresponds to JBIG coding.

14. An image processing method according to claim 12, wherein the termination code corresponds to JBIG coding.

15. An image processing method according to claim 10, further comprising, storing the first and second coded data, wherein decoding the first and second coded data occurs after all the first and second coded data corresponding to the page are stored.

16. An image processing method according to claim 10, wherein generating the image data from a page description language, and judging whether the image data includes the object data during a generation of the image data from the page description language.

17. An image processing method according to claim 10, wherein a processing part omits the compression processing when values of the image data are all zero.

18. An image processing method according to claim 10, wherein the compression part compresses the image data to the first coded data when the image data includes a value of other than zero, and a processing part omits the compression processing and outputs the second coded data when the image data are all zero.

* * * * *